(12) United States Patent
Harrington et al.

(10) Patent No.: US 10,270,522 B2
(45) Date of Patent: *Apr. 23, 2019

(54) SYSTEMS AND METHODS FOR INCREASING THE TRANSMISSION SPEED OF A SATELLITE VSAT

(71) Applicant: Hughes Network Systems, LLC, Germantown, MD (US)

(72) Inventors: Emanuel Girard Harrington, Bowie, MD (US); Paul E. LaCasse, New Market, MD (US); Mohana Subhash Oltikar, Germantown, MD (US); Raymond Helfrich, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,514

(22) Filed: Sep. 12, 2017

(65) Prior Publication Data

US 2018/0013487 A1    Jan. 11, 2018

Related U.S. Application Data

(63) Continuation of application No. 14/587,422, filed on Dec. 31, 2014, now Pat. No. 9,762,313.

(51) Int. Cl.
*H04B 7/185* (2006.01)

(52) U.S. Cl.
CPC ..... *H04B 7/18528* (2013.01); *H04B 7/18517* (2013.01); *H04B 7/18519* (2013.01); *H04B 7/18595* (2013.01)

(58) Field of Classification Search
CPC ............ H04B 7/18595; H04B 7/18528; H04B 7/18519; H04B 7/18517
See application file for complete search history.

(56) References Cited

U.S. PATENT DOCUMENTS

| 7,123,649 B1 | 10/2006 | Smith |
| 2005/0271083 A1 | 12/2005 | Spinoso |

FOREIGN PATENT DOCUMENTS

| WO | WO 00/57625 | * | 1/2000 |
| WO | 2000057625 | | 9/2000 |

OTHER PUBLICATIONS

International Search Report and Written Opinion for PCTUUS2015067706, dated Apr. 14, 2016, EPO.

* cited by examiner

*Primary Examiner* — Yemane Mesfin
*Assistant Examiner* — Henry Baron
(74) *Attorney, Agent, or Firm* — Sheppard Mullin Richter & Hampton LLP

(57) ABSTRACT

Systems and methods are provided for increasing or decreasing the transmission speed of a VSAT used in a satellite network. A VSAT may include an ASIC and an FPGA in a transmission block of the VSAT. The ASIC includes an ASIC transmit modulator configured to modulate an input information signal, and circuitry for bypassing at least a portion of the ASIC transmit modulator. The FPGA includes circuitry for receiving a signal bypassing at least a portion of the ASIC transmit modulator, and an FPGA transmit modulator configured to modulate the bypassed signal. In implementations, the system uses the ASIC to burst format an input information signal with a payload burst segment; bypasses a transmit modulator of the ASIC after burst formatting the input information signal with the ASIC; and uses an FPGA to insert additional burst segments into the ASIC burst-formatted signal.

27 Claims, 14 Drawing Sheets

| Radio Turn ON 351 | UW 352 | Payload (N symbols) 353 | Radio Turn OFF 354 |

| Radio Turn ON 361 | UW Preamble 362 | Payload 363 | Pilot 364A | Payload 363 | ... | Pilot 364N | Payload 363 | UW Postamble 365 | Radio Turn OFF 366 |

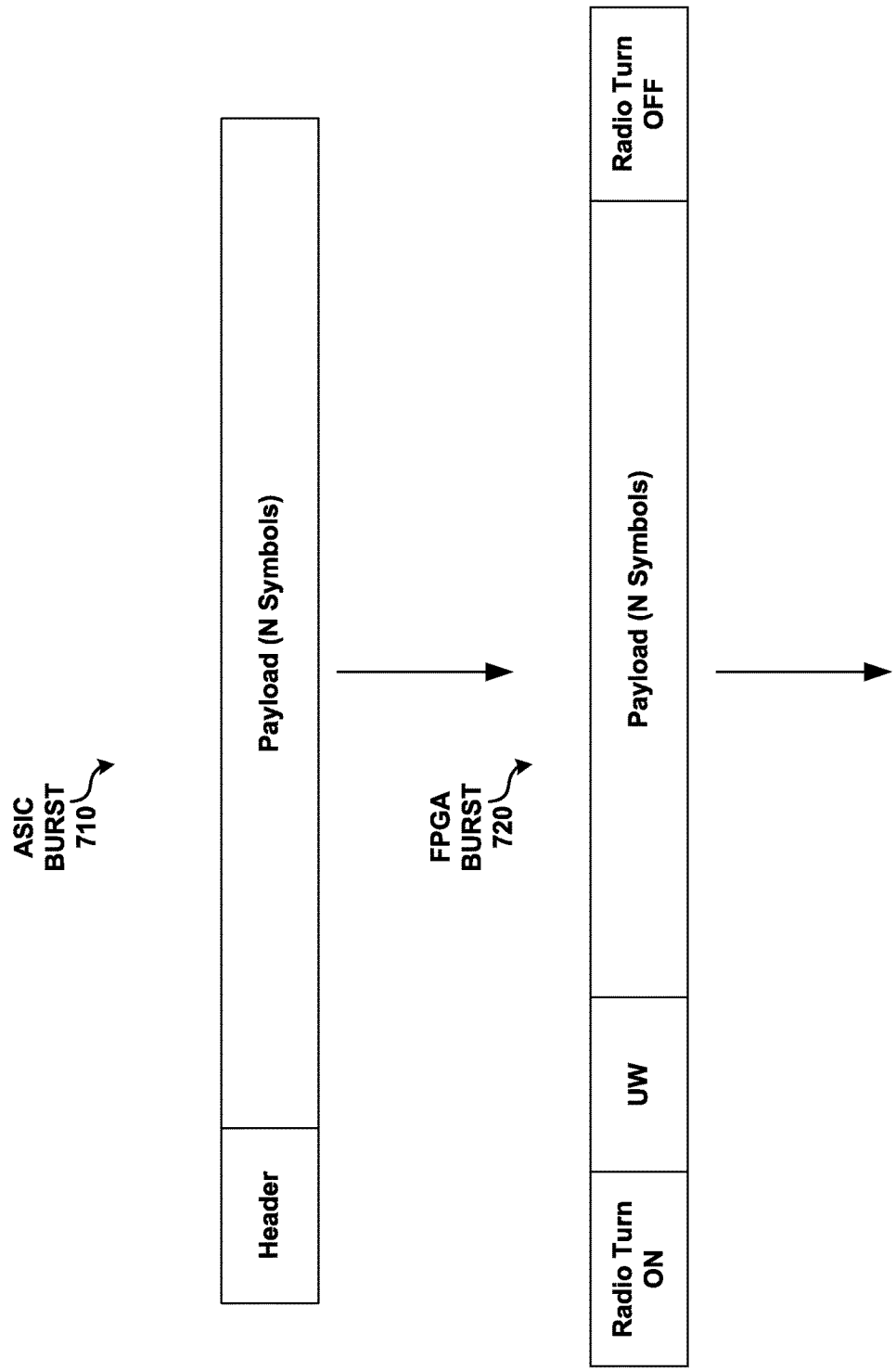

SYSTEMS AND METHODS FOR INCREASING THE TRANSMISSION SPEED OF A SATELLITE VSAT

CROSS-REFERENCE

This application is a continuation of and claims the benefit of U.S. patent application Ser. No. 14/587,422 filed on Dec. 31, 2014, now U.S. Pat. No. 9,762,313, issued Sep. 12, 2017, which is incorporated herein by reference in its entirety.

TECHNICAL FIELD

The present disclosure relates generally to satellite networks. More particularly, some embodiments of the present disclosure are directed toward systems and methods for increasing the transmission speed of a VSAT used in a satellite network.

BACKGROUND

Modern satellite communication systems provide a robust and reliable infrastructure to distribute voice, data, and video signals for global exchange and broadcast of information. These satellite communication systems have emerged as a viable option to terrestrial communication systems for carrying data traffic such as Internet traffic. A typical satellite Internet system comprises subscriber terminals, a satellite, a ground station, and connectivity to the internet. Communication in such a system occurs along two links: 1) an uplink (or inroute) from a subscriber terminal to the satellite to the ground station to the gateway to the Internet; and 2) a downlink (or outroute) from the internet to the gateway to the ground station to the satellite to the subscriber terminal.

Very Small Aperture Terminals (VSATs) are commonly used as subscriber terminals for transmitting and receiving wireless signals on phase modulated carriers in satellite communications systems. On the transmission (inroute) side, a VSAT includes an indoor unit for modulating a signal with information, a block upconverter (BUC) for upconverting the frequency band of the signal, and a parabolic dish for focusing and transmitting the upconverted signal to a satellite. FIG. 1 illustrates a conventional implementation of transmission circuitry 120 in an indoor unit. Transmission circuitry 120 includes a forward error correction (FEC) block 121, an application-specific integrated circuit (ASIC) modulator 122, and digital-to-analog (DAC) converter 127. As illustrated, the conventional VSAT encodes bits into bursts on an ASIC modulator 122 based on a designated FEC rate and a start of burst (SOB) time determined by a modulation SOB timing unit 124.

More particularly, burst formatter 123 formats a signal into a burst format (e.g., 8PSK-burst format) by inserting pilot symbols, unique words (UW), a payload, and ramp and guard symbols. Symbol mapper 125 then performs the functions of bit-to-symbol conversion, burst segment scaling, signal spreading, and continuous wave generation (CW). Transmit filter circuitry 126 subsequently shapes and upsamples the signal using filters such as an RRC filter, a polyphase filter, a ramper, a phase-locked loop (PLL) precompensation filter, a quadrature modulator, etc. As illustrated, ASIC modulator 122 directly outputs the modulated data signal (i.e., I and Q data channels) to a DAC converter 127 that then feeds the signal to a BUC.

Current implementations of Jupiter VSAT terminals are limited to transmission symbol rates of 8 Msps or lower due to the conventional transmit filter design implementation. The current design is problematic as it is unable to take advantage of interfacing with higher power linear block upconverters (BUC) capable of supporting an inroute satellite link with greater data transmission speeds.

SUMMARY

Systems and methods are provided in various embodiments for increasing or decreasing the transmission speed of a VSAT used in a satellite network. In accordance with one embodiment, a VSAT may comprise an ASIC and an FPGA. The ASIC comprises an ASIC transmit modulator configured to modulate an input information signal, and circuitry for bypassing at least a portion of the ASIC transmit modulator. The FPGA comprises circuitry for receiving a signal bypassing at least a portion of the ASIC transmit modulator, and an FPGA transmit modulator configured to modulate the bypassed signal. In implementations of this embodiment, the ASIC comprises a burst formatter configured to burst format the input information signal before the ASIC modulator is bypassed.

In accordance with one embodiment of the technology disclosed herein, the VSAT comprises an indoor unit and an outdoor unit. In implementations of this embodiment, the ASIC, FPGA, or both may be in the indoor unit. In accordance with another embodiment of the technology disclosed herein, the ASIC comprises an ASIC outdoor unit control (ODUC) signal block, and the FPGA comprises an FPGA ODUC signal block coupled to an output of the ASIC ODUC signal block.

In accordance with yet another embodiment of the technology disclosed herein, the system includes a DAC with an input coupled to an output of the FPGA, and with a DAC output coupled to a block upconverter (BUC).

In accordance with still another embodiment, a method implemented by the system comprises using an ASIC to burst format an input information signal with a payload burst segment; bypassing a transmit modulator of the ASIC after burst formatting the input information signal; and using an FPGA to insert additional burst segments into the ASIC burst-formatted signal. In a particular implementation of this embodiment, the ASIC burst-formatted signal comprises one burst segment, wherein the one burst segment is a payload segment.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 3B illustrates an example burst transmission format that may be used to transmit burst signals in accordance with embodiments of the disclosure.

FIG. 3C illustrates another example burst transmission format that may be used to transmit burst signals in accordance with embodiments of the disclosure.

FIG. 7C illustrates burst segments of a burst signal after burst formatting by an ASIC and after burst formatting by an FPGA.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

Various embodiments of the systems and methods disclosed herein provide techniques for increasing or decreasing the symbol transmission rate of a VSAT by bypassing an ASIC modulator normally used to modulate a transmission signal. The bits that normally feed the ASIC modulator are instead passed to a field-programmable gate array (FPGA), which is able to achieve higher symbol rates (e.g., 12 Msps, 16 Msps, etc.) and lower symbol rates (e.g., 128 ksps) using an improved modulator design. In various embodiments, the functionality of the disclosed technology may be implemented in a VSAT indoor unit, an outdoor unit, or some combination thereof.

In implementations of the disclosed technology, the ASIC encodes the burst transmission signal with fewer segments so that it can feed enough signal samples to the FPGA to achieve faster symbol transmission rates. Subsequently, the FPGA may add in the symbol segments needed for burst transmission over a satellite network.

The disclosed technology provides many benefits over the conventional ASIC modulation-based design. First, the disclosed technology supports a wider range of symbol rates, including, 128 ksps, 256 ksps, 512 ksps, 1024 ksps, 2048 ksps, 4096 ksps, 6144 ksps, 8192 ksps, 12288 ksps and 16384 ksps. Second, the disclosed technology supports a variety of signal modulation formats, including: QPSK, OQPSK, 8PSK, 16APSK, pi/2 8PSK, pi/4 QPSK, two map modulation schemes, etc. Further still, the programmability of the FPGA allows greater flexibility in troubleshooting and adjusting the implemented signal modulation algorithms.

Figure 2A:
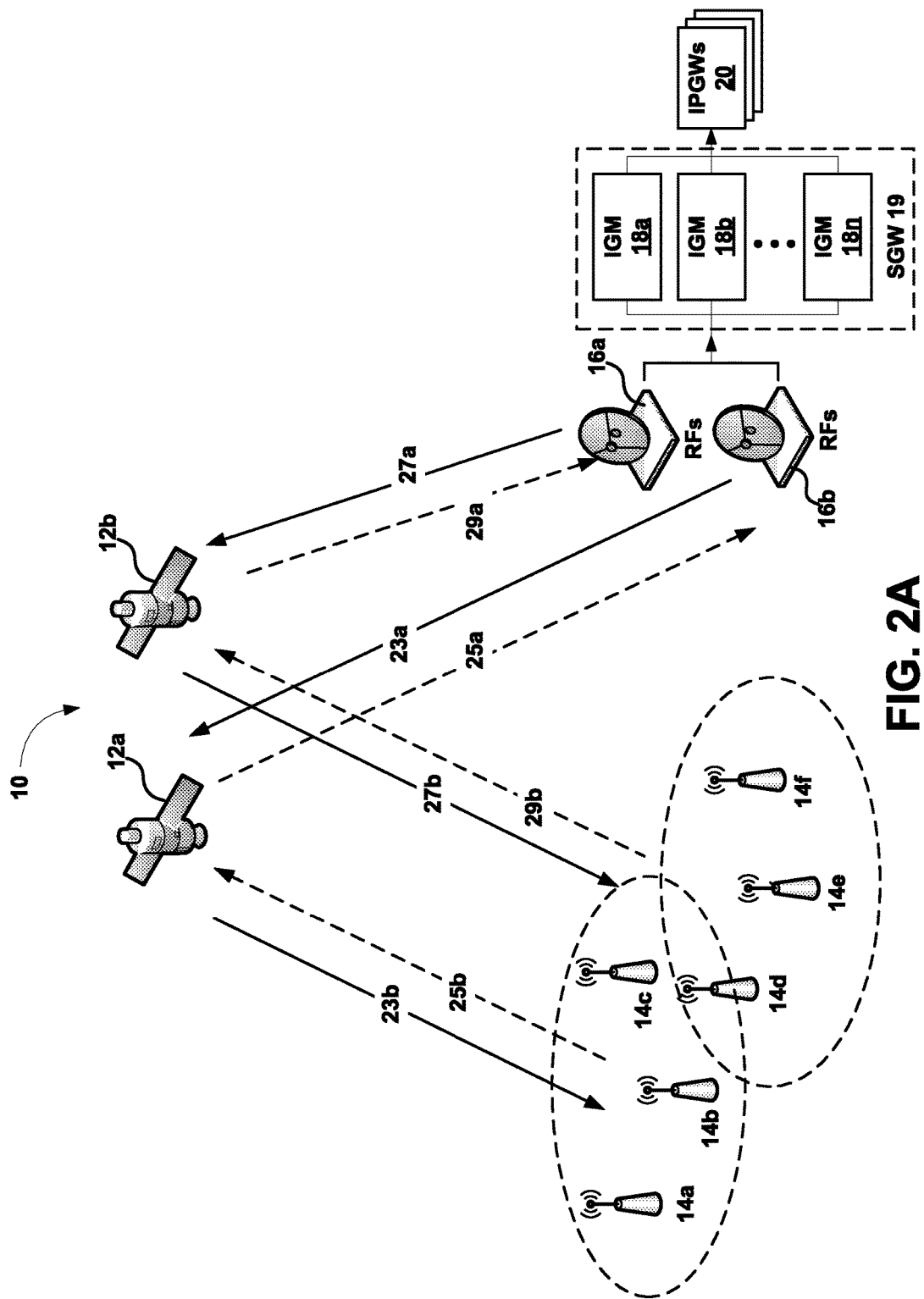
FIG. 2A illustrates an example multi-satellite data transmission system in which various embodiments of the disclosure may be implemented.

FIG. 2A illustrates an example satellite network 10 in which elements involved in satellite communications/traffic are described. Satellite network 10 in this example can include multiple satellites 12a and 12b, remote terminals 14a-14f, radio frequency (RF) terminals 16a and 16b, multiple inroute group managers (IGMs) 18a, 18b, . . . 18n, satellite gateway (SGW) 19, and IP gateways (IPGWs) 20. The satellite network may be a shared access broadband network. Other types of shared access networks may include, for example, wireless networks such as $4^{th}$ Generation Long Term Evolution (4G LTE) and WiMAX networks, which may include terminals other than Very Small Aperture Terminals (VSATs), such as cellular and WiFi equipped devices.

Feeder links may carry data between RF terminals 16a and 16b and satellites 12a and 12b, and may include: forward uplinks 23a and 27a for transmitting data from RF terminals 16a and 16b to satellites 12a and 12b, respectively; and return downlinks 25a and 29a for transmitting data from satellites 12a and 12b, respectively, to RF terminals 16a and 16b. User links may carry data between satellites 12a and 12b and remote terminals 14a-14f, and may include: return uplinks 25b and 29b for transmitting data from remote terminals 14a-14f to satellites 12a and 12b, respectively; and forward downlinks 23b and 27b for transmitting data from satellites 12a and 12b, respectively, to remote terminals 14a-14f. Forward uplinks 23a, 27a and forward downlinks 23b, 27b may form an outroute, and return uplinks 25b, 29b and return downlinks 25a, 29a may form an inroute. SGW 19 may include high capacity earth stations with connectivity to ground telecommunications infrastructure. SGW 19 may be communicatively connected to RF terminals 16a and 16b. RF terminals 16a and 16b may be the physical equipment responsible for sending and receiving signals to and from satellites 12a and 12b, respectively, and may provide air interfaces for SGW 19/IPGWs 20.

Satellites 12a and 12b may be any suitable communications satellites. For example, satellites 12a and 12b may be bent-pipe design geostationary satellites, which can accommodate innovations and variations in transmission parameters, operating in the Ka-band, Ku-band, or C-band. Satellites 12a and 12b may use one or more spot beams as well as frequency and polarization reuse to maximize the total capacity of satellite network 10. Signals passing through satellites 12a and/or 12b in the forward direction may be based on the DVB-S2 standard (ETSI EN 302 307) using signal constellations up to and including at least 32-APSK. The signals intended to pass through satellites 12a and 12b in the return direction (from terminals 14a-14f) may be based on the Internet Protocol over Satellite (IPoS) standard (ETSI TS 102 354). Other suitable signal types may also be used in either direction, including, for example higher data rate variations of DVB-S2.

Figure 1:
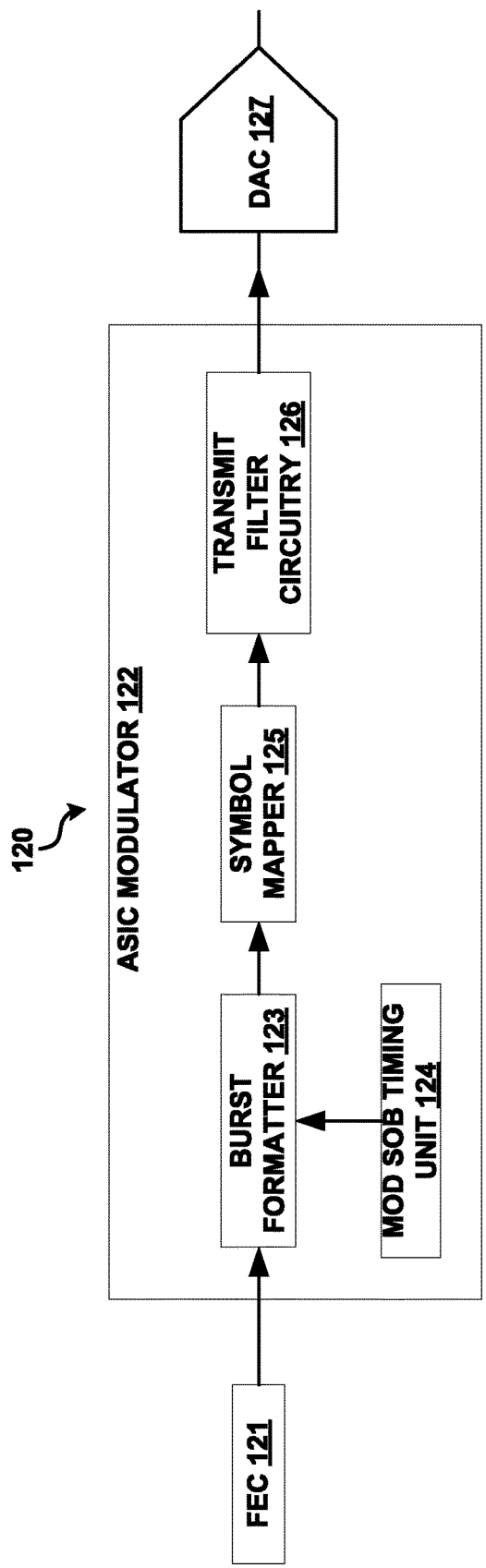
FIG. 1 is a block diagram illustrating a conventional implementation of transmission circuitry in an indoor unit of a VSAT.

IPGWs 20 may be an ingress portion of a local network. IP traffic, including TCP traffic, from the internet may enter an SGW 19 through IPGWs 20. IPGWs 20 may each include a spoofer, which may acknowledge IP traffic, including TCP traffic sent to SGW 19. Moreover, SGW 19 may be connected to an internet through IPGWs 20. IP traffic, including TCP traffic, from the internet may enter SGW 19 through IPGWs 20. As illustrated in FIG. 1, multiple IPGWs may be connected to a single IGM. The bandwidth of RF terminals 16a and 16b can be shared amongst IPGWs 20. At each of IPGWs 20, real-time (RT) and NRT traffic flows may be classified into different priorities. These traffic flows may be processed and multiplexed before being forwarded to priority queues at SGW 19. RT traffic may go directly to an RT priority queue or SGW 19, while NRT traffic flows may be serviced based on the respective priority and volume. Data may be further packed into DVB-S2 code blocks and stored in a code block buffer before transmission.

Data from the internet intended for remote terminals 14a-14f (e.g., VSATs) may be in the form of IP packets, including TCP packets and UDP packets, or any other suitable IP packets, and may enter SGW 19 at any one of IPGWs 20, where the respective spoofer may send an acknowledgment back to the sender of the IP packets. The IP packets may be processed and multiplexed by SGW 19 along with IP packets from other IPGWs, where the IPGWs may or may not have the same service capabilities and relative priorities. The IP packets may then be transmitted to satellites 12a and 12b on forward uplinks 23a and 27a using the air interfaces provided by RF terminals 16a and 16b. Satellites 12a and 12b may then transmit the IP packets to the VSATs using forward downlinks 23b and 27b. Similarly, IP packets may enter the network via the VSATs, be processed by the VSATs, and transmitted to satellites 12a and 12b on return uplinks 25b and 29b. Satellites 12a and 12b may then send these inroute IP packets to the SGW 19/IPGWs 20 using return downlinks 25a and 29a.

Each of remote terminals 14a-14f may connect to the Internet through satellites 12a and 12b and IPGWs 20/SGW 19. For example, remote terminal 14a may be used at a residence or place of business to provide a user with access to the Internet. VSATs or Mobile Satellite Terminals (MSTs), may be used by end users to access the satellite network, and may include a remote satellite dish for receiving RF signals from and transmitting RF signals to satellite 12a, as well as a satellite modem and other equipment for managing the sending and receiving of data. They may also include one or more remote hosts, which may be computer systems or other electronic devices capable of network communications at a site.

At SGW 19, one or more IGMs can be implemented (IGMs 18a, 18b, . . . 18n). These IGMs may be bandwidth controllers running bandwidth allocation algorithms. The IGMs may manage bandwidth of the remote terminals 14a-14f in the form of inroute groups (IGs), based in part on bandwidth demand requests from the remote terminals 14a-14f.

Figure 2B:
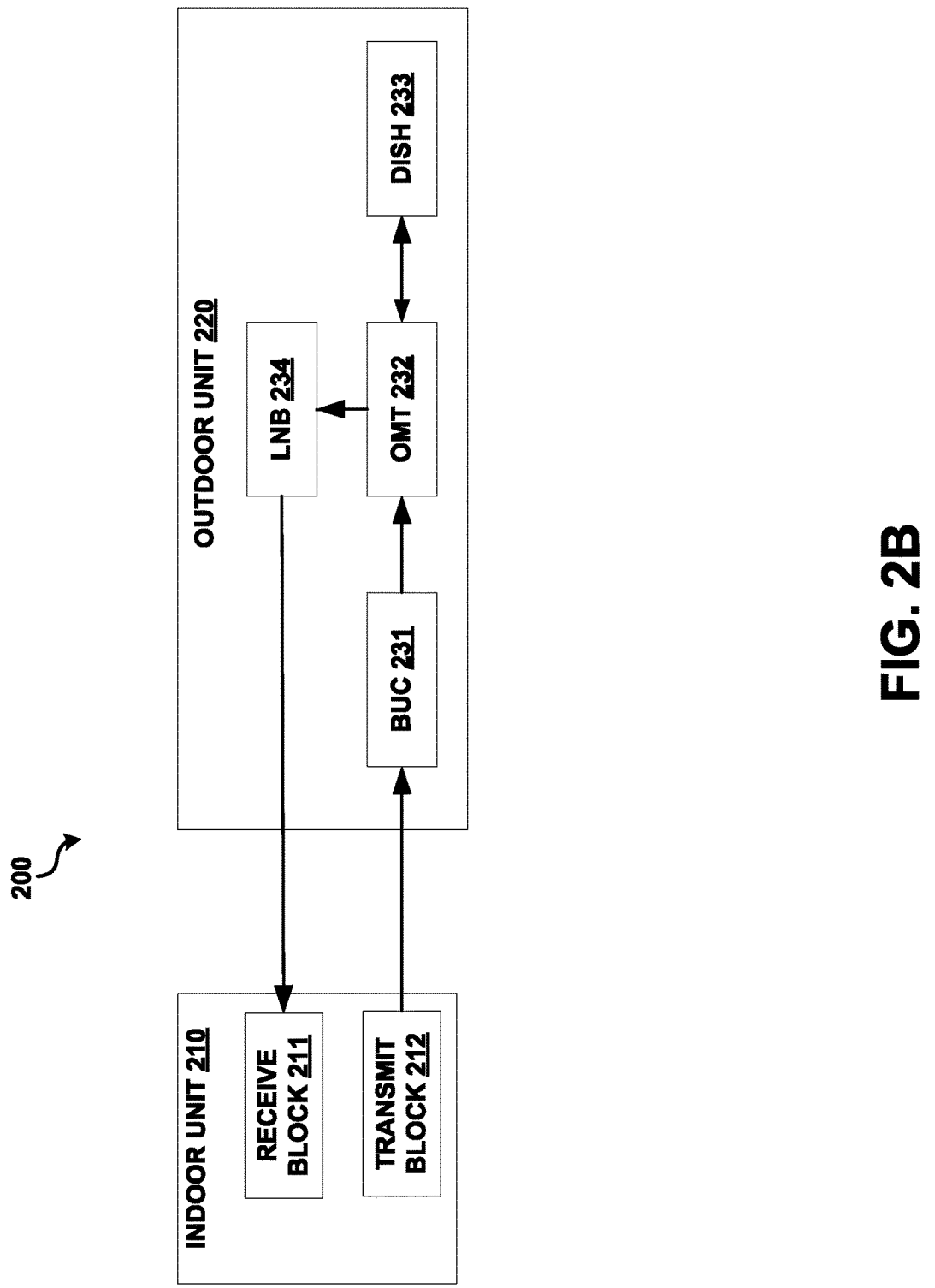
FIG. 2B is a block diagram illustrating an exemplary VSAT that may be used to implement embodiments of the technology disclosed herein.

FIG. 2B is a block diagram illustrating an exemplary VSAT 200 that may be used to implement embodiments of the technology disclosed herein. As illustrated, VSAT 200 comprises an indoor unit 210 and an outdoor unit 220. Outdoor unit 220 includes a block up converter (BUC) 231, orthomode transducer (OMT) 232, a low-noise block (LNB) downconverter 234, and antenna dish 233. BUC 231 may be mounted on dish 233 and is used in the transmission of satellite inroute signals. It frequency upconverts a signal received from transmit block 212 of indoor unit 210. The unconverted signal may be sent through a horn to dish 233, which focuses the signal into a narrow beam for transmission.

LNB 234 may be mounted on dish 233 and is configured to receive the outroute signal collected by dish 233, amplify it, and downconvert the band of received frequencies. The downconverted signal is then transmitted to indoor unit 210 for processing. OMT 232 may orthogonally polarize the receive and transmit signals, thereby preventing interference and protecting LNB 234 from burnout by the power of the output signal generated by BUC 231. In various implementations, dish 233 may be any small aperture parabolic antenna design configured to receive and transmit electromagnetic signals to and from one or more satellites.

In various embodiments, indoor unit 210 may be a set-top box including a receiver block 211 and a transmit block 212. Receiver block 211 receives downconverted outroute signals from LNB 234 and may perform functions such as signal decryption and decoding to extract information (e.g., data, voice, video) from the received signals. The extracted information may then be used by a user of VSAT 200 (e.g., for Internet or Satellite TV).

Transmit block 212 may receive information from a user's equipment (not shown) or from the set-top box itself, and it may modulate a reference signal in accordance with this information to produce a modulated information signal. The modulated information signal may then be transmitted to an outdoor unit 220 over a cable (e.g., a coaxial cable) for upconversion by BUC 231 and transmission by dish 233. The transmitted signal may carry any suitable information, such as, for example, data, voice, and video information. In one embodiment, transmit block 212 may supply outdoor unit 220 with a DC power signal, a carrier on/off signal, or both. Either or both of these signals may be multiplexed with the modulated information signal and transferred to outdoor unit 220 as a single signal via a single cable.

As will be further described below, the transmit reference signal may be modulated at transmit block 212 based on the DVB-S2 standard (ETSI EN 302 307) using signal constellations up to and including at least 32-APSK. As will also be described below, signal modulation may be performed using an FPGA that receives data signal lines that bypass an ASIC modulator. Before describing such a hardware configuration, it is useful to describe the transmit properties of VSAT 200.

Figure 3A:
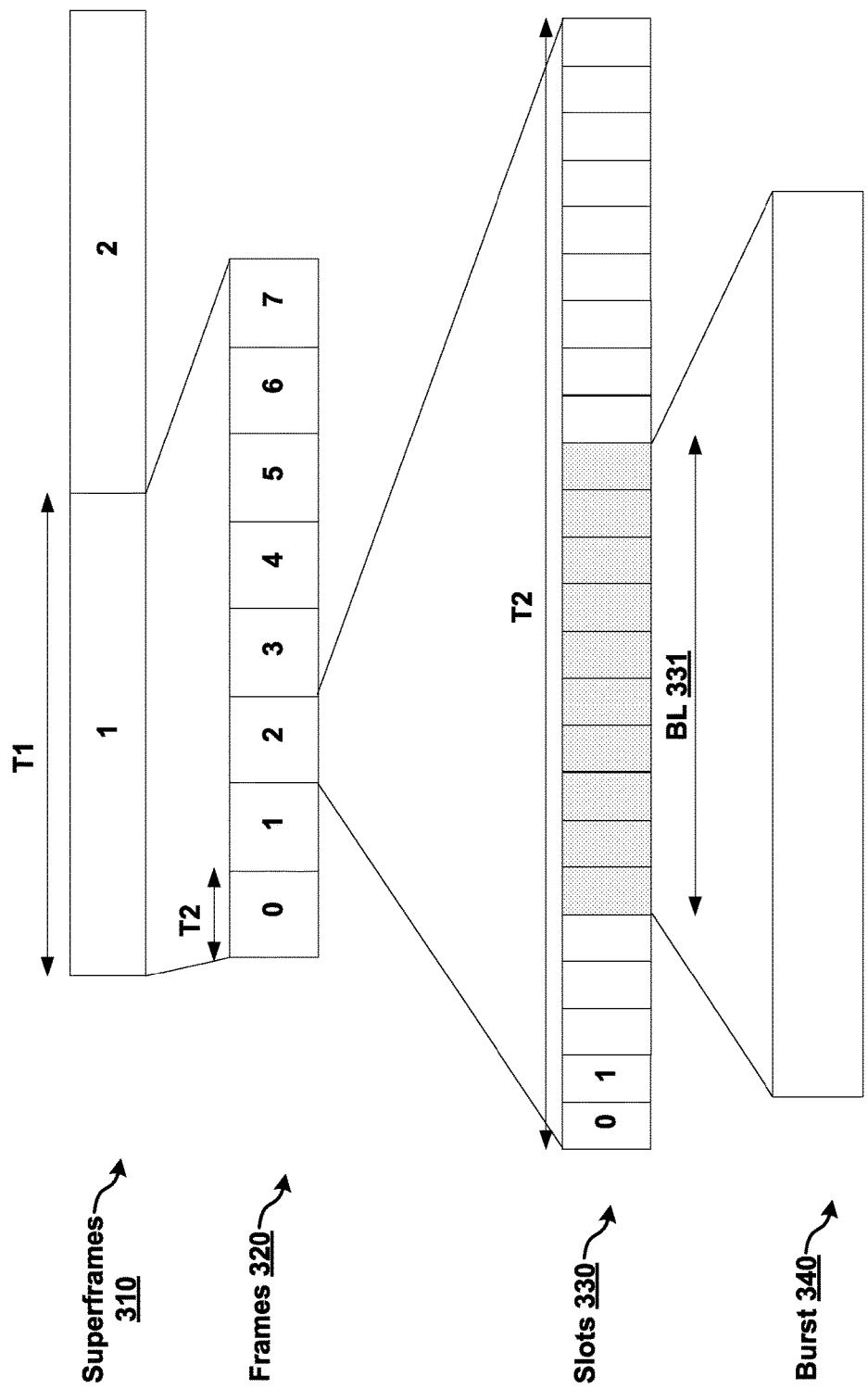
FIG. 3A is a diagram illustrating the frame structure of inroute transmissions in accordance with one embodiment.

FIG. 3A is a diagram illustrating the frame structure of inroute transmissions in accordance with one embodiment. As illustrated, inroute signals may be transmitted by one or more VSAT terminals 200 following a time division multiple access (TDMA) method that allows several VSAT terminals 200 to share the same inroute carrier. As shown, the TDMA frame structure comprises inroute super frames 310 of duration T1 that include a plurality of frames 320 of duration T2. Each frame 320 is further divided into a plurality of slots 330, each slot 330 including a plurality of symbols. In various embodiments, the number of slots per frame may depend upon the transmission symbol rate and the slot size (in symbols).

As further shown, a burst 340 with burst length (BL) 331 may be transmitted within a variable number of slots within a frame. In various embodiments, the burst length may vary depending on available resources. FIGS. 3B and 3C illustrate example burst transmission formats 350 and 360 that may be used to transmit burst signals in accordance with embodiments of the disclosure. As illustrated, burst transmission format 350 may be used for OQPSK modulation. The OQPSK burst format includes a radio turn on field or segment 351, a unique word (UW) segment 352, a payload segment 353, and a radio turn off segment 354. In various implementations, burst transmission format 360 may be used for a 8PSK or 16APSK burst format depending on the number of symbols allocated per segment. Burst transmission format 360 includes a radio turn on segment 361, a UW preamble segment 362, payload segment 363, a plurality of pilot segment symbols 364-364N interspersed between the payload segments, a UW postamble segment 365, and a radio turn off segment 366. In various embodiments, different modulations (e.g., QPSK, OQPSK, 8PSK, 16APSK, etc.) and associated FEC code rates (e.g., 1/2, 2/3, 4/5, 8/9, 9/10) may be used on one or more carrier frequencies.

The correct arrival time of each burst at a satellite is important for ensuring successful transmission of the bursts. Accordingly, in various embodiments a VSAT terminal 200 may time the start of a burst based on various parameters. One such scheme for determining the burst start time will now be described with reference to FIG. 4, which illustrates the timing relationship between a gateway and VSAT terminal 200. More particularly, FIG. 4 illustrates gateway outroute frames 410, gateway inroute frames 420, and terminal inroute frames 430 during transmission.

Figure 4:
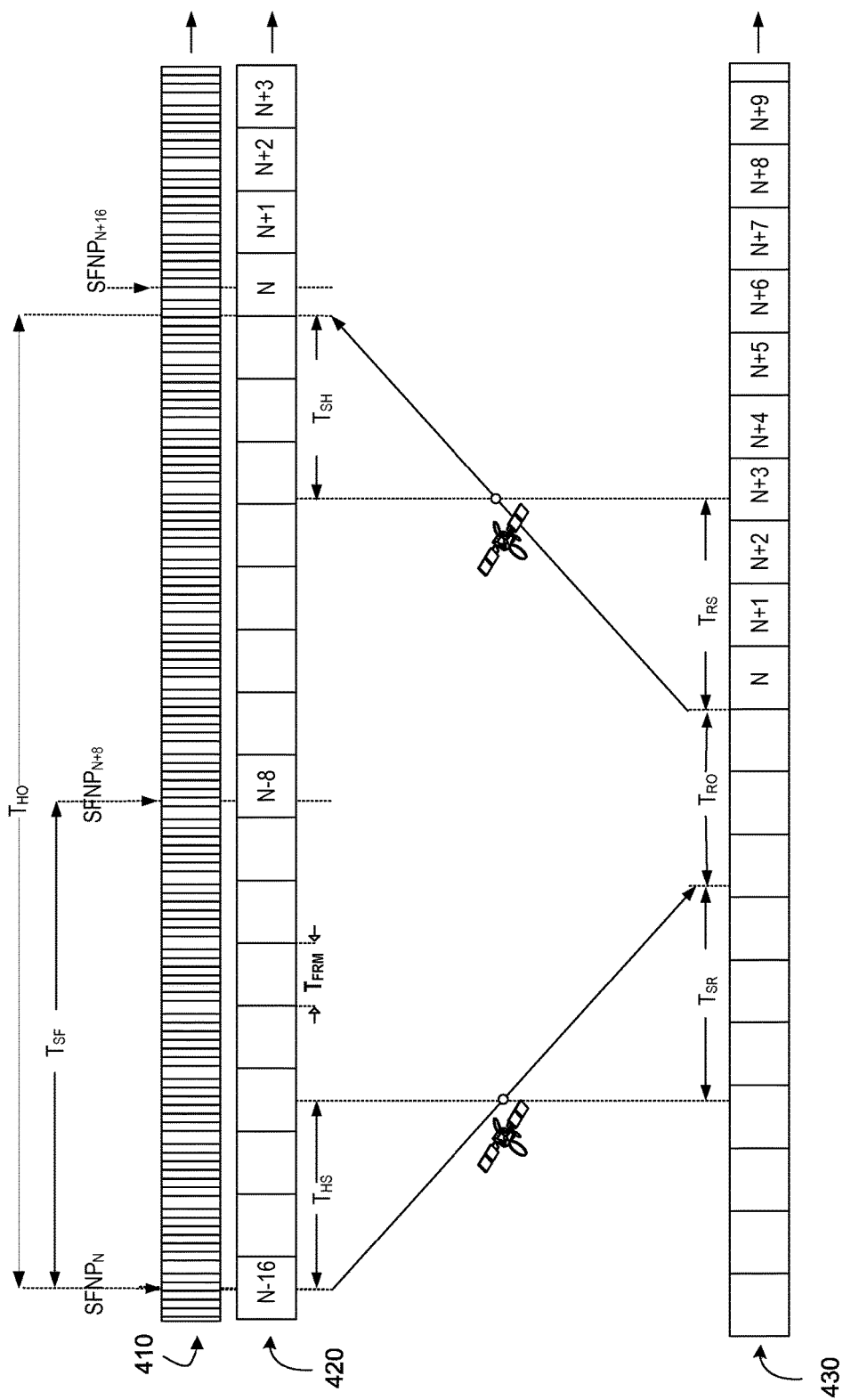
FIG. 4 illustrates the timing relationship between a gateway and VSAT terminal in accordance with embodiments of the disclosure.

A vertical line on FIG. 4 illustrates what is happening at the gateway (at the top) and at the terminal (at the bottom) at the same time. On the inroute, the horizontal (time) axis is marked in units equal to the length of an inroute frame. As described above, terminals may access the inroute by transmitting in bursts, each of which occupies multiple slots. A unique word (UW) is placed at the start of the burst in order to allow burst detection at the gateway. The burst can be detected only if the last symbol of the UW arrives within the aperture.

In order to time its bursts correctly, the terminals must 1) establish a time reference tightly synchronized to the gateway's time reference and 2) consider time varying propagation delays. By itself, the standard DVB-S2 outroute does not have any time marker that a terminal can use to synchronize its time reference with the gateways. Accordingly, in various embodiments, each gateway of the satellite system may broadcast on the outroute a timing reference in the form of superframe numbering packet (SFNP), to some or all terminals in a beam. As illustrated, the SFNP is transmitted by the gateway on the outroute once every $T_{SF}$.

As shown, the gateway may start the inroute TDMA frame N one time interval, $T_{HO}$, after it transmits the $SFNP_N$. In various embodiments, $T_{HO}$ is set large enough such that an SFNP can be received by a terminal that is farthest away from the satellite, have that terminal perform signal processing, then transmit a data burst in time to be received back at the gateway at the start of the frame number given in the SFNP packet. If $T_{HO}$ satisfies this condition, a terminal may receive a bandwidth allocation packet (BAP) and have sufficient time for processing the BAP and transmit a burst on the bandwidth allocated in the BAP. In one mathematical implementation of these embodiments, $T_{HO}$ may be determined based on Equation (1):

$$T_{HO}=T_{HS}+T_{SR}+T_{RO}+T_{RS}+T_{SH} \quad (1)$$

Where $T_{HO}$ is the gateway offset time measured from the intended instant of SFNP transmission, $T_{HS}$ is the propagation time from the gateway to the satellite, $T_{SR}$ is the propagation time from the satellite to the terminal, $T_{RO}$ is the terminal offset time, $T_{RS}$ is the propagation time from terminal to satellite, $T_{SH}$ is the propagation time from satellite to gateway, and $SFNP_N$ is the superframe numbering packet that marks frame N. Accordingly, the terminal offset time $T_{RO}$ may be expressed as Equation (2):

$$T_{RO}=T_{HO}-T_{HSH}-T_{SRS} \quad (2)$$

Where $T_{HSH}$ is the gateway-to-satellite roundtrip time, $T_{HS}+T_{SH}$, and $T_{SRS}$ is the satellite-to-terminal roundtrip time, $T_{SR}+T_{RS}$.

Because the actual instant of SFNP transmission is slightly delayed from the intended instant of SFNP transmission due to transmission processing in the gateway, in various embodiments the delay between the intended and the actual instants of transmission (local delay) is measured at the gateway and broadcast in the next SFNP. In these embodiments, terminals may use this value in each SFNP to correct for the local delay of the previous SFNP. For example, if a terminal transmits at the end of its $T_{RO}$ interval after receiving a $SFNP_N$, the gateway will receive the burst in the first slot within frame N. Subsequently, if the terminal transmits at a later slot in the frame N (or in a subsequent frame), it may add the local delay to the end of the next $T_{RO}$ interval to determine the time of transmission. Thus, the $T_{RO}$ may be varied to account for the original transmission variance. In addition, it may be used to adjust for the movement of the satellite in orbit due to satellite drift.

Figure 5:
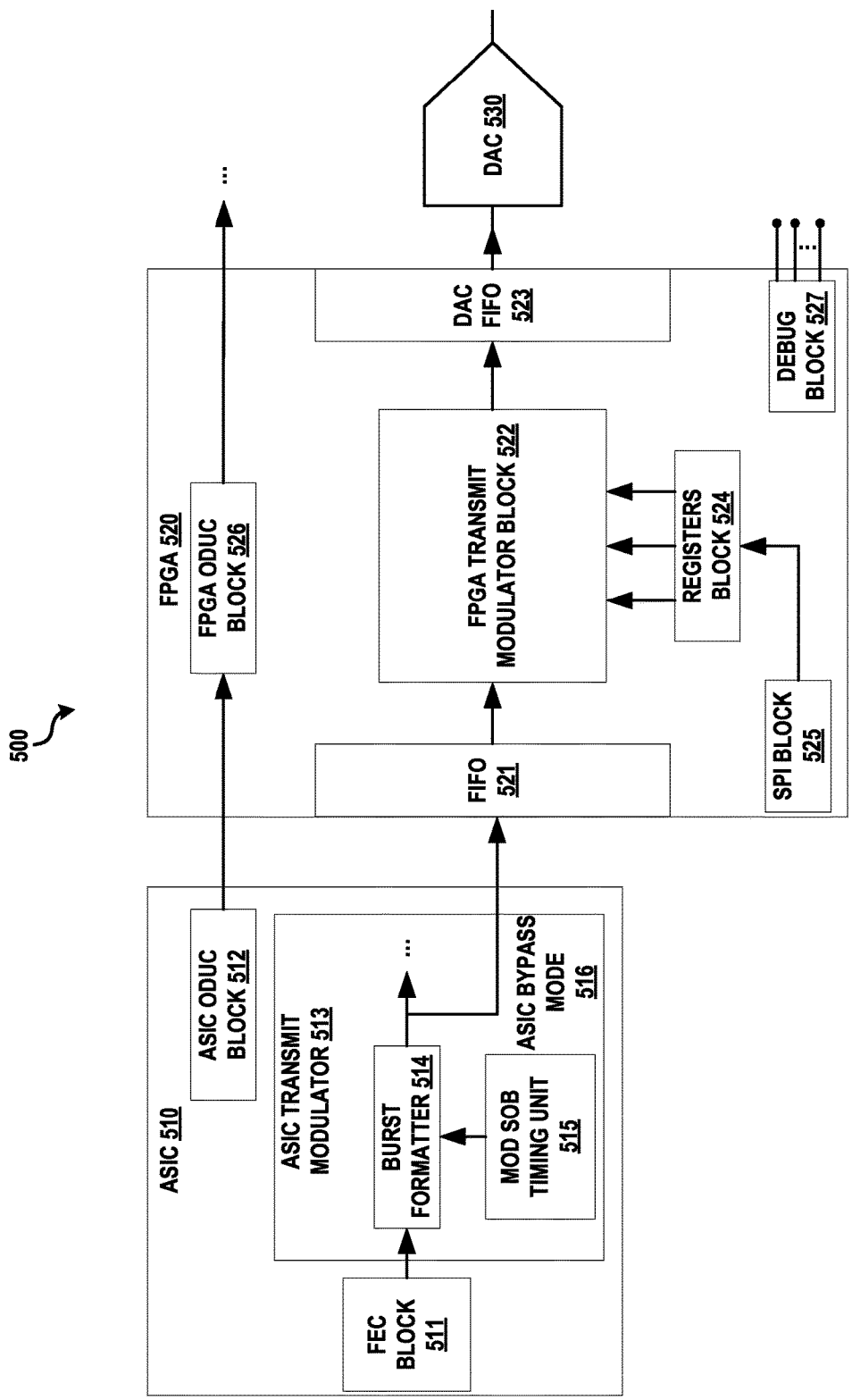
FIG. 5 is a block diagram illustrating exemplary circuitry that may be used in a VSAT indoor unit transmission block to implement the technology disclosed herein.

With reference again to transmission block 212, FIG. 5 illustrates exemplary circuitry 500 that may be used in transmission block 212 to implement the technology disclosed herein. As will be further described below, a modulation chain inside ASIC transmit modulator 513 may be bypassed, thereby allowing external modulation by FPGA 520 using FPGA transmit modulator block 522. It should be noted that although circuitry 500 is described with reference to an indoor unit 210, some or all of circuitry 500 may be implemented in an outdoor unit to achieve the functionality described herein. For example, in one embodiment FPGA 520 may be implemented in an outdoor unit 220.

As shown, circuitry 500 comprises an ASIC 510, FPGA 520, and DAC 530. ASIC 510 may comprise an FEC Block 511 for providing code rates for a given modulation scheme, an ASIC outdoor unit control (ODUC) block 512 that supplies a signal for controlling whether the ODU is bursting, and ASIC transmit modulator 513 configured to modulate reference signal with information for burst transmissions on the inroutes. In various embodiments, the modulation chain inside modulator 513 may be bypassed by activating an ASIC bypass mode 516 in ASIC 510. In yet further embodiments, the ASIC may dynamically switch between a bypass mode and a regular mode. In implementations of these embodiments, the bypass may be switched using a software module. In one embodiment, a register (not shown) in ASIC transmit modulator 513 may set a multiplexer to output either the regular output or the bypassed output.

In embodiments where the modulation chain is not bypassed (i.e. regular mode), the burst signal may be modulated using circuitry (not shown) in ASIC transmit modulator 513. In these embodiments, the ASIC modulated signal may be directly passed to DAC 530, and the burst signal may transmit at the symbol rates permitted by the ASIC hardware.

In embodiments where the ASIC operates in an ASIC bypass mode 516, the burst may be assembled into the different burst segments by burst formatter 514 prior to bypassing the modulation chain. Burst formatter 514 may assemble the segments based on parameters such as the code rates provided by FEC block 511 and burst timing information (e.g. terminal offset time and local delay) provided by modulation start of burst (SOB) timing unit 515. These burst segments may include data signals and control signals. Accordingly, the timing information as well as data may be passed to FPGA 520 via first-in first-out (FIFO) 521. In one embodiment, the burst segments may be multiplexed as I and Q signals prior to passing them to FIFO 521.

Table 1, below, illustrates an exemplary set of data and control signals that may be assembled and subsequently passed to FPGA 520 in a particular embodiment of the technology disclosed herein.

TABLE 1

Signals Output by Burst Formatter

| Signal Bits | Signal Type | Signal Description |
|---|---|---|
| 1 | Timing | Start of Burst for Modulator |
| 1 | Timing | Start of Burst for Burst Formatter output |
| 1 | Timing | End of Burst for Burst Formatter output |
| 1 | Timing | Rate Change signal indicating symbol rate change for next burst |
| 1 | Timing | Start of Segment indicator of Burst Formatter |
| 4 | Data | Burst Formatter data output to Mapper |
| 1 | Timing | Data Valid indicator for the data output |
| 1 | Timing | Unique Word (UW) segments before and after payload |
| 3 | Burst Info | Symbol Rate of current burst |
| 4 | Burst Info | Modulation Type of current burst |
| 1 | Clock | 122.88 MHz clock running the Burst Formatter |
| 1 | Timing | Signal indicating start of a new symbol |

As illustrated in this particular embodiments, 4 bits of data signals and 16 bits of control signals (i.e., timing, burst info, and clock) are passed. The 4 bits of data may be associated with a given modulation type such as, for example, a 2-bit modulation scheme, a 3-bit modulation scheme, or 4-bit modulation scheme.

With reference now to FPGA 520, it may comprise a FIFO 521, an FPGA transmit modulator block 522, DAC FIFO 523, registers 524, serial port interface (SPI) block 525, FPGA ODUC block 526, and debug block 527 with ports for performing testing and troubleshooting. As illustrated, the output of ASIC ODUC block 512 may be coupled to the input of FPGA ODUC block 526. In various embodiments, FPGA ODUC block 526 receives the ODUC control signal supplied by ASIC ODUC block 512 and delays it so that the control signal will follow the path of the delay in the data incurred by the FPGA. Accordingly, FPGA ODUC block 526 may be used to start the burst out of the ODU at an appropriate time.

SPI block 525 may initialize the FPGA and dynamically configure the burst signal parameters by providing them to Registers Block 524. In various embodiments, Registers Block 524 may store all of the variables used by FPGA modulator block 522 during signal modulation, such as, for example, a symbol rate, a map constellation, a UW burst segment, ramp segments, pilot segments, etc. In various embodiments, register block 524 may comprise any combination of shift registers or cyclic registers.

In various embodiments, Registers Block 524 may comprise an FPGA start of burst (SOB) Timing Control configured to apply additional timing controls, based on the FPGA design, to the control signals received over the ASIC interface. In implementations of these embodiments, the Timing Control may delay the SOB and end of burst (EOB) based on the transmission symbol rate used at the FPGA. Additionally, the SOB Timing Control may detect a partial symbol timing adjustment by monitoring SOB timing and performing corresponding phase adjustment in a polyphase filter of modulator block 522. For example, when transmission is earlier than normal, it may determine that a short symbol (fewer samples) is required. As another example, when transmission is faster than normal, it may determine that a long symbol (more samples). Further, the SOB Timing Control may route the SOB/EOB to different modules in FPGA transmit modulator block 522. Further still, the SOB Timing Control may generate a signal to indicate the start of valid burst samples to the DAC 530.

DAC FIFO 523 may hold the modulated data signal (symbols) written by a transmit filter chain in FPGA transmit modulator block 522. DAC 530 then receives the modulated data signal (i.e., I and Q data channels) from DAC FIFO 523 and performs a digital to analog conversion before forwarding the signal to an ODU.

Figure 6A:
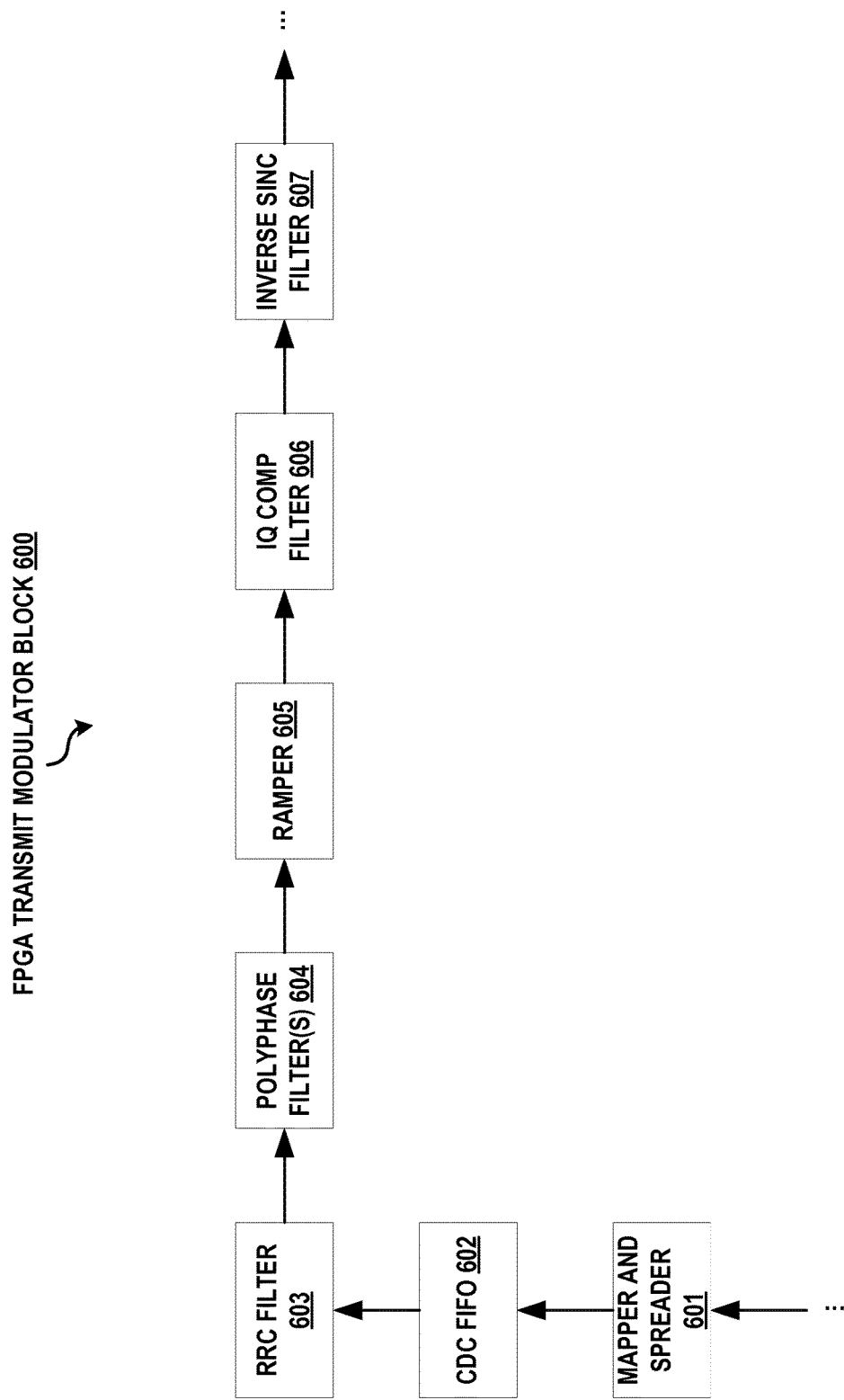
FIG. 6A is a block diagram illustrating example circuitry for an FPGA transmit modulator block in accordance with a particular embodiment of the technology disclosed herein.

FIG. 6A illustrates example circuitry for an FPGA transmit modulator block 600 in accordance with a particular embodiment of the technology disclosed herein. In various embodiments, the input of example FPGA transmit modulator block 600 may be the output of a FIFO (e.g. FIFO 521), which received as an input the bypassed ASIC burst-formatted signal. As illustrated, a mapper and spreader block 601 may perform constellation mapping for coherent modulation and symbol spreading to reduce the power spectral density of the dish antenna output at low symbol rates. Clock domain crossing (CDC) FIFO 602 may subsequently enable symbol crossover from the clock domain of burst formatter 514 to the remaining transmit filter chain of block 600. For example, in one particular embodiment, CDC FIFO 602 may be used to crossover from a 122.88 Mhz clock domain to an 80 MHz clock domain. Further, CDC FIFO 602 may reconcile the data pushed into it in real symbol time and withdrawn in jittered timing.

Root-raised-cosine (RRC) filter 603 may subsequently upsample the input symbol rate to four times the symbol rate. Further, RRC filter 603 may offset the Q-branch of OQPSK modulated signals by ½ symbol or 2 samples. Subsequently one or more polyphase filters 604 may convert all input symbol rates to a fixed symbol rate (e.g., 80 Msps).

Figure 6B:
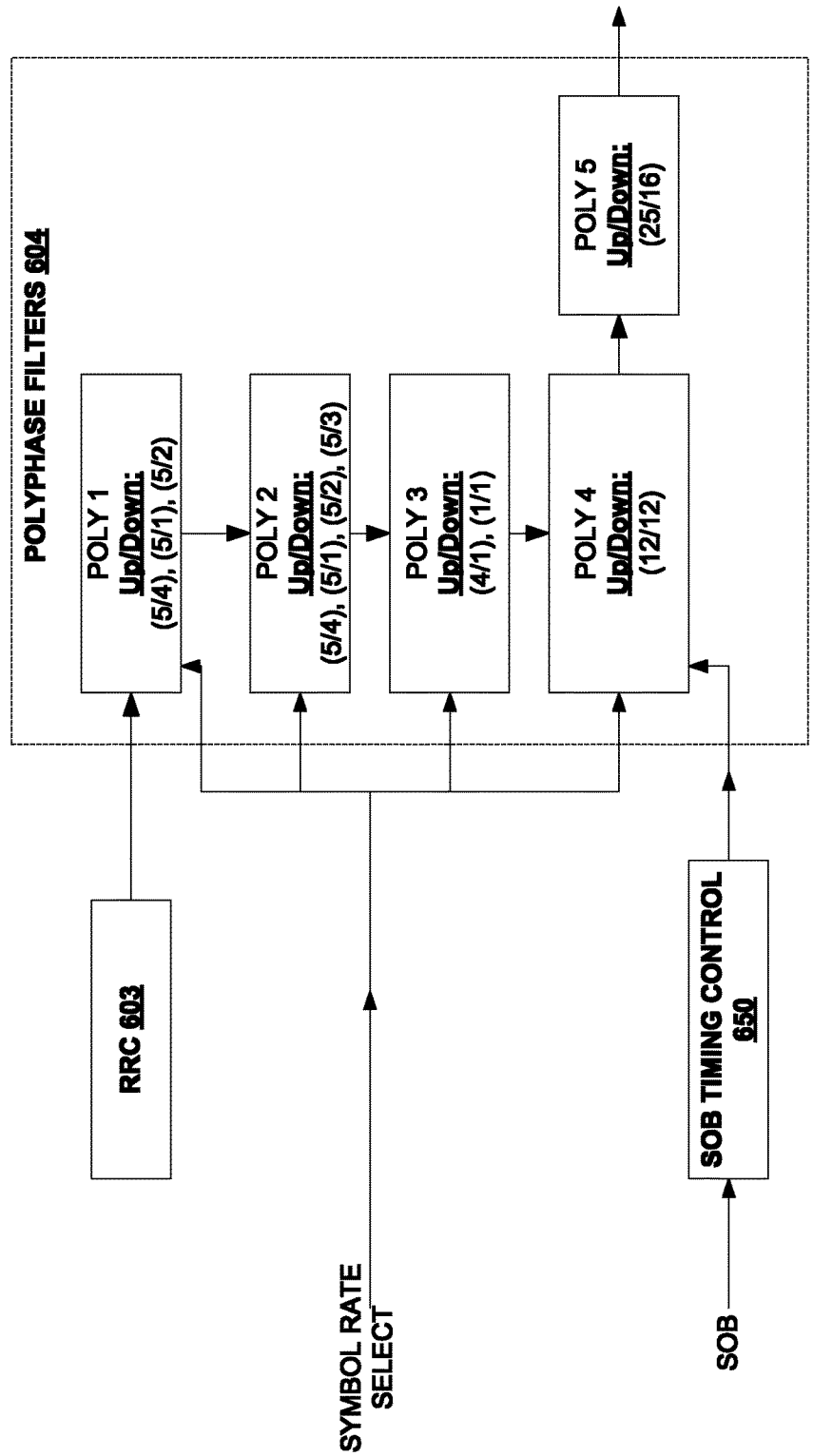
FIG. 6B is a block diagram illustrating a particular polyphase filter configuration that may be used by the circuitry of FIG. 6A.

FIG. 6B illustrates one particular embodiment of a plurality of polyphase filters 604 used to provide this functionality. As illustrated, a SOB timing control 650 of an FPGA registers block provides a timing input to the fourth polyphase filter such that the fourth polyphase filter performs sub-symbol timing adjustment. In this embodiment, the FPGA registers block may also provide a symbol transmission rate as an input. It is worth noting that the polyphase filters are used to generate different responses based on the phase of the current symbol. In various embodiments, the number of phases in the ASIC may be hardcoded. Accordingly, in implementations of these embodiments the FPGA modulator may use different up and down sampling rates in the polyphase filters 604 to enable faster and slower symbol rates than the ASIC.

Ramper 605 may subsequently limit the output power increase and decrease rate by windowing the input signal using a predetermined waveform. In various embodiments, the ramper may be time aligned with a delayed SOB and EOB received from the SOB timing control module. Subsequently, an IQ imbalance compensation filter 606 may pre-compensate the DC offset, amplitude and phase irregularities of the modulated signal in DAC 530. Inverse Sinc filter 607 may then pre-compensate for the sinc frequency response distortion of DAC 530.

Figure 7A:
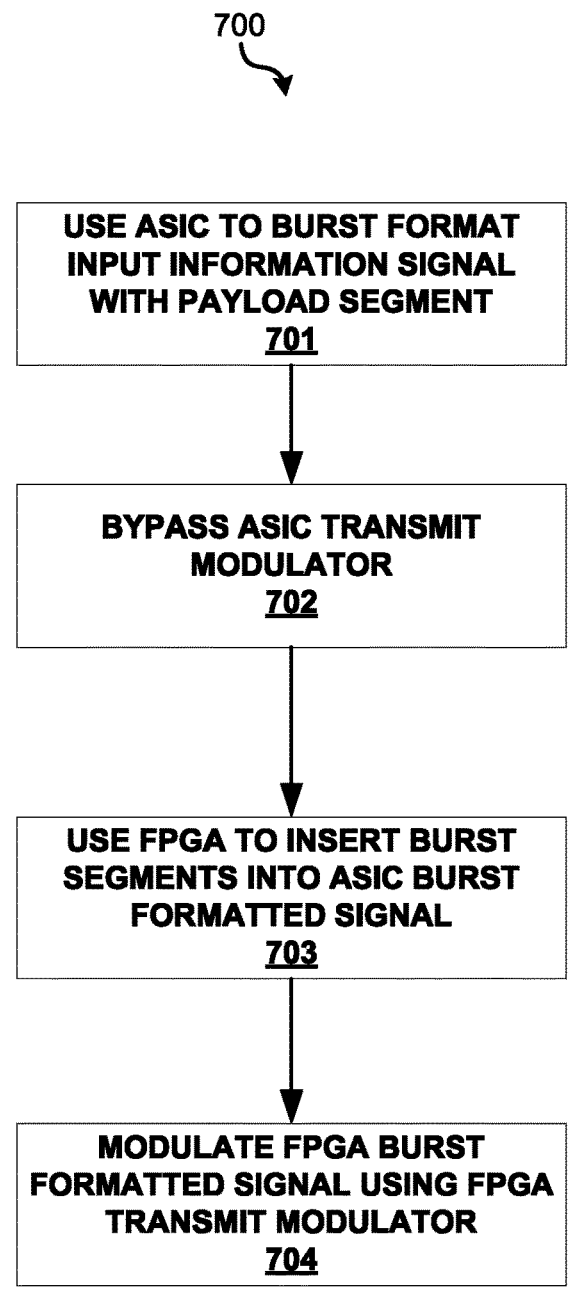
FIG. 7A is an operational flow diagram illustrating an exemplary method for burst formatting an information signal to obtain faster modulation rates in accordance with embodiments of the technology disclosed herein.
Figure 7B:
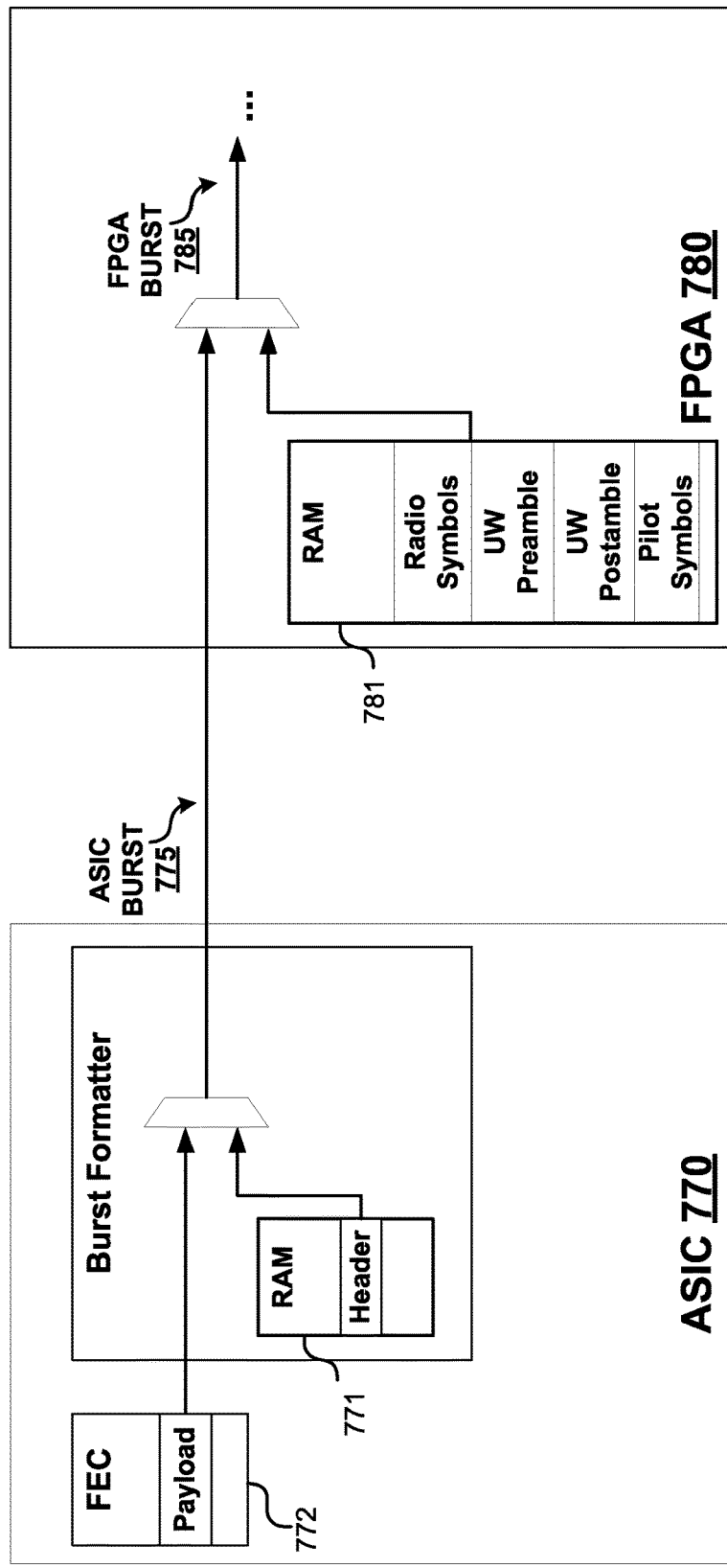
FIG. 7B is a block diagram illustrating an example system that may be used to implement the functionality of the method of FIG. 7A.

FIG. 7A is an operational flow diagram illustrating an exemplary method 700 for burst formatting an information signal to obtain faster modulation rates in accordance with embodiments of the technology disclosed herein. Before describing method 700, It is worth noting that in order to transmit at a higher symbol rate than the ASIC output and have enough data for a transmission, the data supplied to the FPGA from the ASIC needs to either be faster or have known burst segments as part of the FPGA design. Accordingly, in various embodiments, illustrated by FIG. 7B, the burst payload and a header may be supplied from a FEC 772 and memory 771 of ASIC 770 to generate ASIC burst 775, while the Radio On, Unique Words symbols and Pilot symbols may be contained in a memory 781 of FPGA 780 to generate FPGA burst 785.

In various embodiments, method 700 may be implemented by transmission block circuitry comprising an ASIC with an ASIC modulation bypass mode (e.g. circuitry 500). Method 700 will be described concurrently with FIG. 7C, which illustrates burst segments of a burst signal after burst formatting by an ASIC and after burst formatting by an FPGA.

With reference now to method 700, at operation 701 the ASIC is used to burst format an input information signal with a payload segment. In various embodiments, operation 701 is implemented such that the ASIC output is programmed with a minimum number of burst segments. For example, the ASIC output may be programmed such that any UW, ramp, and pilot segments are excluded from the ASIC burst formatted signal. The segments may be generated in the FPGA because they are random symbols used to pad the actual information (burst payload). Accordingly, in various embodiments the ASIC burst formatted signal may comprise between one and six segments, with the one segment ASIC burst comprising only a payload segment. ASIC output 710 illustrates one such example ASIC burst formatted signal comprising a header and burst payload segment.

At operation 702, the ASIC burst formatted signal bypasses the remainder of the ASIC transmit modulator. For example, in one embodiment the ASIC burst formatted signal may be input into a FIFO of an FPGA as illustrated in FIG. 5. At operation 703, an FPGA inserts additional burst segments into the ASIC burst formatted signal. For example, the FPGA may insert any needed UW, ramp, and pilot segments for transmission over a wireless medium in accordance with various modulation schemes. In various embodiments, these additional burst segments may be received from a registers block (e.g. block 524) of the FPGA. FPGA burst 720 illustrates one such example FPGA burst formatted signal comprising radio turn on/off segments, a UW segment, and the payload segment from ASIC burst 710.

Subsequently, at operation 704 the burst-formatted signal is modulated using an FPGA transmit modulator, such as, for example, FPGA transmit modulator 600. In various embodiments of method 400, the ASIC may output a first burst modulation scheme (e.g., 16APSK) at a first symbol rate (e.g. 4-bits per symbol), and the FPGA may output a second burst modulation scheme (e.g., OQPSK) at a faster symbol rate.

Figure 7D:
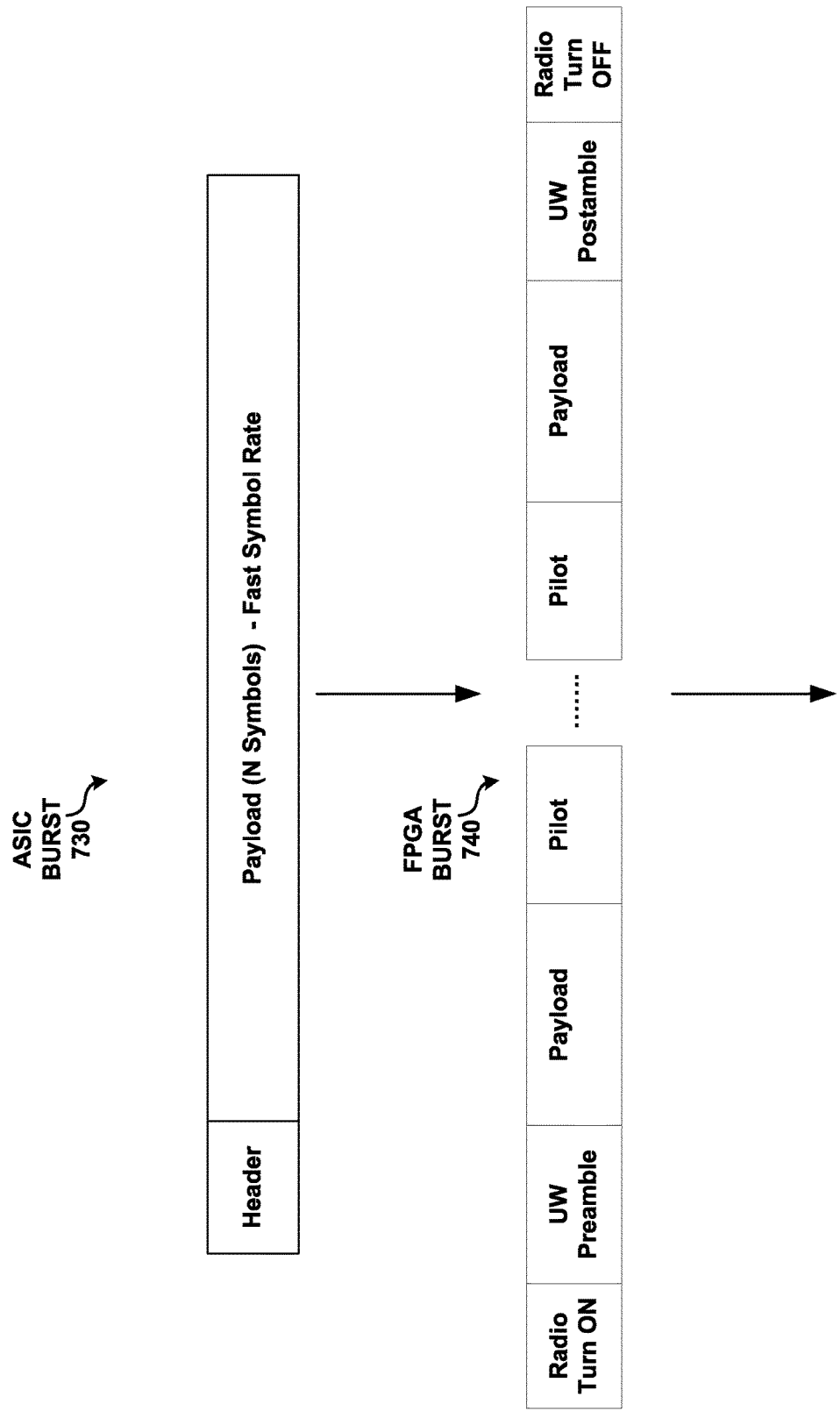
FIG. 7D illustrates burst segments of a burst signal after burst formatting by an ASIC and after burst formatting by an FPGA.

Alternatively, in other embodiments the ASIC may output a first burst modulation scheme at a faster symbol rate than the subsequent FPGA burst modulation scheme. In these alternative embodiments, the FPGA may be configured to transmit bursts at a symbol rate lower than what it is achievable by the ASIC hardware, thereby providing the option of low symbol rate transmission. FIG. 7D illustrates burst segments of ASIC burst 730 and FPGA burst 740 after formatting by an ASIC and after formatting by an FPGA in accordance with this embodiment. The transmitted bursts may be separated in time more to achieve the slower symbol rate.

Figure 8:
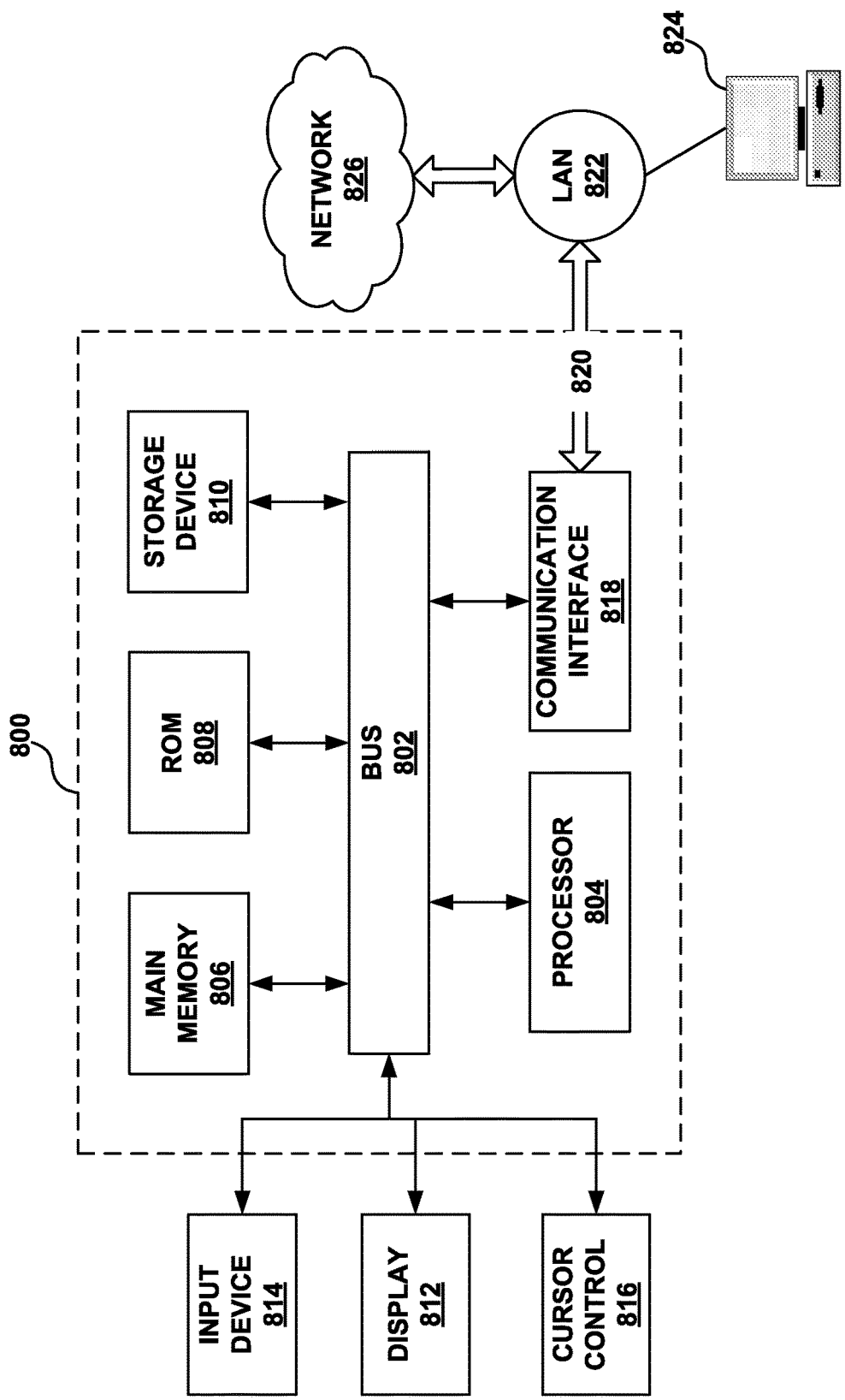
FIG. 8 illustrates an example computing module that may be used in implementing features of various embodiments.

FIG. 8 illustrates a computer system 800 upon which example embodiments according to the present disclosure can be implemented. Computer system 800 can include a bus 802 or other communication mechanism for communicating information, and a processor 804 coupled to bus 802 for processing information. Computer system 800 may also include main memory 806, such as a random access memory (RAM) or other dynamic storage device, coupled to bus 802 for storing information and instructions to be executed by processor 804. Main memory 806 can also be used for storing temporary variables or other intermediate information during execution of instructions to be executed by processor 804. Computer system 800 may further include a read only memory (ROM) 808 or other static storage device coupled to bus 802 for storing static information and instructions for processor 804. A storage device 810, such as a magnetic disk or optical disk, may additionally be coupled to bus 802 for storing information and instructions.

Computer system 800 can be coupled via bus 802 to a display 812, such as a cathode ray tube (CRT), liquid crystal display (LCD), active matrix display, light emitting diode (LED)/organic LED (OLED) display, digital light processing (DLP) display, or plasma display, for displaying information to a computer user. An input device 814, such as a keyboard including alphanumeric and other keys, may be coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812.

Processor 804 may execute an arrangement of instructions contained in main memory 806. Such instructions can be read into main memory 806 from another computer-readable medium, such as storage device 810. Execution of the arrangement of instructions contained in main memory 806 may cause processor 804 to perform one or more processes described herein. One or more processors in a multi-processing arrangement may also be employed to execute the instructions contained in main memory 806. Alternatively, hard-wired circuitry may be used in place of or in combination with software instructions to perform one or more processes described herein. Thus, the technology described in the present disclosure is not limited to any specific combination of hardware circuitry and software.

Computer system 800 may also include a communication interface 818 coupled to bus 802. Communication interface 818 can provide a two-way data communication coupling to a network link 820 connected to a local network 822. By way of example, communication interface 818 may be a digital subscriber line (DSL) card or modem, an integrated services digital network (ISDN) card, a cable modem, or a telephone modem to provide a data communication connection to a corresponding type of telephone line. As another example, communication interface 818 may be a local area network (LAN) card (e.g. for Ethernet™ or an Asynchronous Transfer Model (ATM) network) to provide a data communication connection to a compatible LAN. Wireless links can also be implemented. In any such implementation, communication interface 818 sends and receives electrical, electromagnetic, or optical signals that carry digital data streams representing various types of information. Further, communication interface 818 may include peripheral interface devices, such as a Universal Serial Bus (USB) interface, a PCMCIA (Personal Computer Memory Card International Association) interface, etc.

Network link 820 typically provides data communication through one or more networks to other data devices. By way of example, network link 820 can provide a connection through local network 822 to a host computer 824, which has connectivity to a network 826 (e.g. a wide area network (WAN) or the global packet data communication network now commonly referred to as the "Internet") or to data equipment operated by service provider. Local network 822 and network 826 may both use electrical, electromagnetic, or optical signals to convey information and instructions. The signals through the various networks and the signals on network link 820 and through communication interface 818, which communicate digital data with computer system 800, are example forms of carrier waves bearing the information and instructions.

Computer system 800 may send messages and receive data, including program code, through the network(s), network link 820, and communication interface 818. In the Internet example, a server (not shown) might transmit requested code belonging to an application program for implementing an embodiment of the present disclosure through network 826, local network 822 and communication interface 818. Processor 804 executes the transmitted code while being received and/or store the code in storage device 810, or other non-volatile storage for later execution. In this manner, computer system 800 obtains application code in the form of a carrier wave.

The term "computer-readable medium" as used herein refers to any medium that participates in providing instructions to processor 804 for execution. Such a medium may take many forms, including but not limited to non-volatile media, volatile media, and transmission media. Non-volatile media include, for example, optical or magnetic disks, such as storage device 810. Volatile media may include dynamic memory, such as main memory 806. Transmission media may include coaxial cables, copper wire and fiber optics, including the wires that comprise bus 802. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD ROM, CDRW, DVD, any other optical medium, punch cards, paper tape, optical mark sheets, any other physical medium with patterns of holes or other optically recognizable indicia, a RAM, a PROM, and EPROM, a FLASH EPROM, any other memory chip or cartridge, a carrier wave, or any other medium from which a computer can read.

Various forms of computer-readable media may be involved in providing instructions to a processor for execution. By way of example, the instructions for carrying out at least part of the present disclosure may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 800. After reading this description, it will become apparent to a person skilled in the relevant art how to implement the application using other computing modules or architectures.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

Terms and phrases used in the present application, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A satellite terminal, comprising:
   circuitry comprising:
      a burst formatter configured to burst format an input information signal;
      a transmit modulator configured to modulate the input information signal burst formatted by the burst formatter; and
      an output configured to output a signal bypassing at least a portion of the transmit modulator, the bypassed signal comprising the input information signal burst formatted by the burst formatter, wherein the circuitry comprises a bypass mode that is activated to bypass the portion of the transmit modulator.

2. The satellite terminal of claim 1, wherein the circuitry is an application-specific integrated circuit (ASIC).

3. The satellite terminal of claim 2, wherein the transmit modulator comprises a register, wherein the register is configured to set a multiplexer to output a bypassed signal.

4. The satellite terminal of claim 1, further comprising:
   second circuitry, comprising:
      an input coupled to the output and configured to receive a signal bypassing at a least a portion of the transmit modulator; and
      a second transmit modulator configured to modulate the bypassed signal.

5. The satellite terminal of claim 4, wherein the second circuitry further comprises: a registers block configured to apply timing controls to control signals received in a burst segment of the received signal bypassing at least a portion of the transmit modulator, where the timing controls are applied based on at least a transmission symbol rate of the second circuitry.

6. The satellite system of claim 4, wherein the circuitry comprising the burst formatter is an ASIC and wherein the second circuitry is a field programmable gate array (FPGA).

7. The satellite terminal of claim 2, wherein the system is a very-small-aperture terminal (VSAT).

8. The satellite terminal of claim 7, wherein the VSAT comprises an indoor unit and an outdoor unit, and wherein the ASIC is in the indoor unit.

9. The satellite terminal of claim 8, wherein the circuitry further comprises an ASIC outdoor unit control (ODUC) signal block, and wherein the second circuitry further comprises an FPGA outdoor unit control (ODUC) signal block coupled to an output of the ASIC ODUC signal block.

10. The satellite terminal of claim 4, further comprising a digital-to-analog converter (DAC) comprising an input and output, wherein the DAC input is coupled to an output of the second circuitry, and wherein the DAC output is coupled to a block upconverter (BUC).

11. The satellite terminal of claim 1, wherein the bypassed signal comprises burst segments comprising data signals and control signals.

12. A method, comprising:
    determining whether to bypass a transmit modulator of a first circuitry;
    based on the determination, setting the first circuitry to a bypass mode or a regular mode;
    using a first circuitry to burst format an input information signal with a payload burst segment;
    if the first circuitry is set to a bypass mode, the burst formatted input information signal bypassing the transmit modulator; and
    if the first circuitry is set to a regular mode, modulating the burst formatted input information signal using the transmit modulator of the first circuitry.

13. The method of claim 12, further comprising:
    setting the first circuitry to the bypass mode; and
    the burst-formatted input information signal bypassing the transmit modulator.

14. The method of claim 13, further comprising: using a transmit modulator of a second circuitry to modulate the bypassed burst-formatted input information signal.

15. The method of claim 13, further comprising: using second circuitry to insert additional burst segments into the bypassed burst-formatted input information signal.

16. The method of claim 15, wherein the additional burst segments comprise at least one of a unique word (UW) segment, a ramp up segment, a ramp down segment, or a pilot segment.

17. The method of claim 13, wherein the first circuitry is an application-specific integrated circuit (ASIC).

18. The method of claim 17, wherein the ASIC is an ASIC of a satellite terminal.

19. The method of claim 14, wherein the first circuitry is an ASIC of a satellite terminal and wherein the second circuitry is a field programmable gate array (FPGA) of the satellite terminal.

20. A method, comprising:
    using first circuitry to burst format an input information signal with burst segments comprising a data signal and a control signal;
    the burst-formatted input information signal bypassing at least a portion of a transmit modulator of the first circuitry; and
    using second circuitry to insert additional burst segments into the bypassed, burst-formatted input information signal.

21. The method of claim 20, further comprising: using a transmit modulator of the second circuitry to modulate the bypassed, burst-formatted input information signal.

22. The method of claim 21, wherein the additional burst segments comprise at least two of a unique word (UW) segment, a ramp up segment, a ramp down segment, or a pilot segment.

23. The method of claim 21, further comprising: the second circuitry applying timing controls to the control signals of the burst segments, where the timing controls are applied based on at least a transmission symbol rate of the second circuitry.

24. The method of claim 21, wherein the first circuitry is an ASIC of a satellite terminal and wherein the second circuitry is a component of the satellite terminal.

25. The method of claim 24, wherein the second circuitry is an FPGA of the satellite terminal.

26. The method of claim 21, wherein the control signal comprises a burst transmission timing signal.

27. The method of claim 21, wherein the control signal comprises a burst information signal comprising burst information of at least one of: a modulation type of a current burst or a symbol rate of a current burst.

* * * * *